June 18, 1940.  F. A. STURM  2,204,778
MARKING IMPLEMENT
Filed Feb. 29, 1940
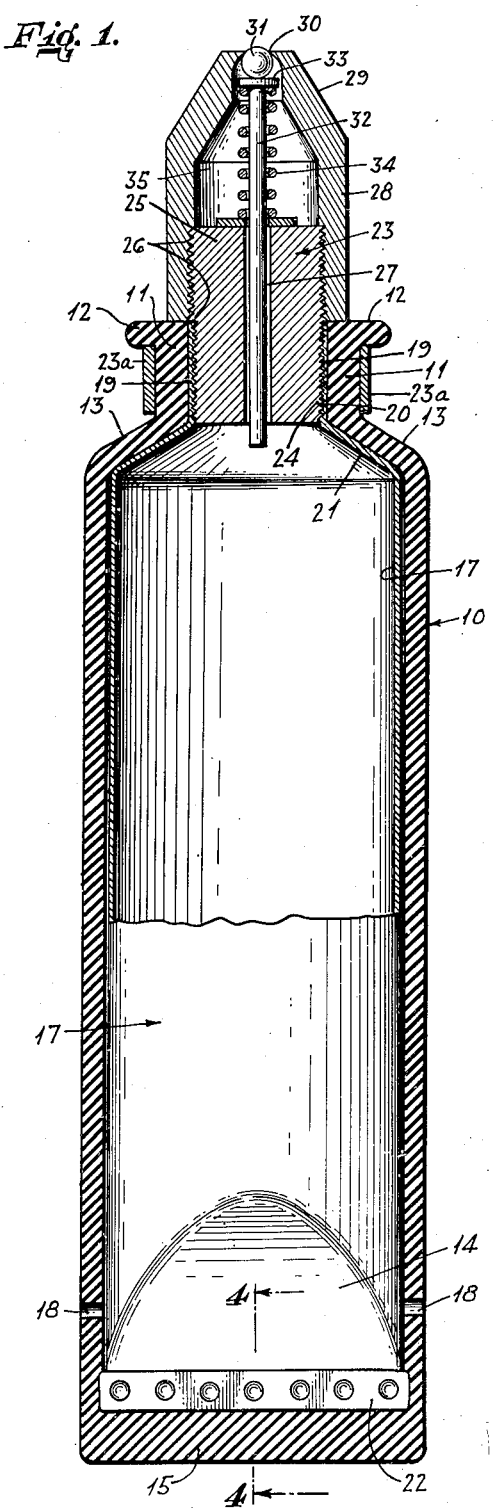
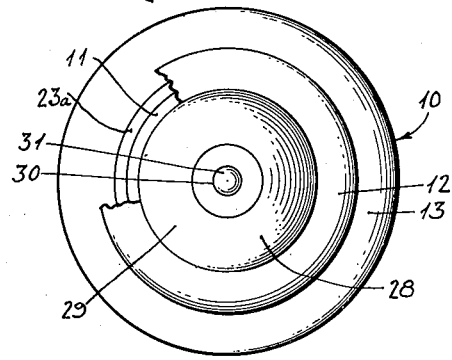
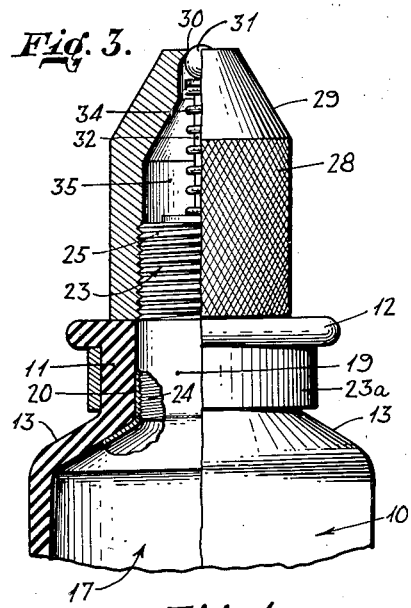
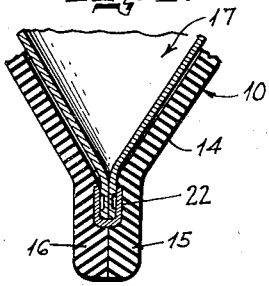
INVENTOR.
FRED A. STURM
BY Richards & Geier
ATTORNEYS Patented June 18, 1940

2,204,778

UNITED STATES PATENT OFFICE 2,204,778

MARKING IMPLEMENT

Fred A. Sturm, Paterson, N. J.

Application February 29, 1940, Serial No. 321,463

5 Claims. (Cl. 120—43)

This invention relates to marking implements and, more particularly, to marking implements which contain therein a viscous marking substance for marking textiles or like material.

In the past, in implements of this type, it has been the practice to use a tubular container of non-elastic material which must be pressed by the writer in order that the marking substance be emitted therefrom. The container would become deformed as the marking substance was squeezed therefrom, it being customary to roll the end of the same toward the marking head so that the substance, which is usually a viscous substance, would be caused to flow from the head of the tube. In this way, as the marking substance was used the container would become smaller and increasingly difficult for the writer to grip when marking material. Often the material of which the tubular container was made would break, due to the pressure executed on the same by the operator when squeezing the marking substance therefrom, which would cause the material being marked to become damaged and the hands of the operator stained from the marking substance emitted through the break in the tubular container.

In United States Patent No. 2,129,186 of which I am co-inventor, a tube of elastic material for containing a marking substance is set forth and described, which tube retained its predetermined shape during use. This marking implement was found impractical with certain types of marking substances, since air was drawn into the tube when the pressure applied to the tube by the operator to squeeze the marking material therefrom was released, the air drawn in hardening the marking substance.

It is an object of the present invention to provide a marking implement for housing a viscous marking substance which will retain its shape as the writing substance is squeezed therefrom, so that the tube will at all times form a handle of predetermined shape which may be easily gripped by the operator and at the same time not allow air to enter and harden the writing substance.

Another object of the present invention is to provide a marking implement having an elastic tubular body portion with a container adapted to hold a viscous marking substance therein, which container is of non-elastic material, the container, when compressed, holding its compressed condition. Substantially all the marking substance may be squeezed from said container, since the tubular body portion will maintain its predetermined shape, thereby being as easily gripped by the operator when all the writing substance is emitted as when the implement is filled with the same.

A still further object of this invention is to provide a marking implement which has a tubular body portion of elastic material with a removable container of non-elastic material for a viscous writing fluid therein, which container may be removed when empty and replaced by a full one.

Other objects of the invention will become apparent in the course of the following specification.

The above and other objects of this invention may be accomplished by providing a hollow tube of an elastic material, preferably rubber, having a hollow neck on the top thereof, the bottom of the tube being opened, so that a tubular container of slightly less diameter than the first-mentioned tube, said container being of non-elastic material and adapted to receive a viscous marking fluid, may be inserted into the tube of elastic material. The bottom of the first tube is then closed.

The inner tube is held in position in relation to the outer tube by means of a nipple, the lower part of which is screwed into the neck of the inner tube, the upper part being adapted to receive a cap having a valve mechanism therein.

The invention will appear more clearly from the following detailed description when taken in connection with the accompanying drawing, showing, by way of example, a preferred embodiment of the invention.

Figure 1 is a side elevational view of the device of this invention partly in section;

Figure 2 is a top plan view thereof;

Figure 3 is a detailed view of the head of the marking implement of this invention partly in section; and Figure 4 is a sectional view taken on the line 4—4 of Figure 1.

Like numerals refer to like parts throughout the several views.

The device of this invention comprises an outer casing 10 of elastic material, preferably rubber, having a hollow neck 11 with a lip 12 thereon, the casing 10 being bevelled at 13 between the neck 11 and body portion of said casing. The casing 10 is of sufficient thickness, so that the shape thereof will be retained at all times when outward pressure is not exerted thereon, and of sufficient resiliency to return to its shape upon release of the outward pressure exerted thereon by the operator.

The casing 10 has a taper 14 at the bottom thereof, said taper having adjacent extensions 15 and 16 adapted to be spread apart and admit a container tube 17 into the interior of the casing 10. The extensions 15 and 16, after the tube 17 is in position within the casing, are fastened together by vulcanizing, rubber, cement or any other means.

The casing 10 has a plurality of air holes 18 therein, so that air may be forced therethrough from the interior of the casing when the casing is compressed and admitted therethrough into the casing when the pressure on the casing is released thereby, allowing said casing to return to its predetermined shape.

The outside diameter of the container tube 17 is slightly less than the inside diameter of the tube 10. The container tube 17 is made of a non-elastic comparatively thin material, such as lead foil, and has a hollow neck 19 screw-threaded on the interior thereof, as shown at 20. Between the neck 19 and main body portion of the tube 17 is a beveled portion 21 which is tapered at substantially the same angle as the bevel 13 of the tube 10. The neck 19 is adapted to fit into the neck 11, the outside diameter of the neck 19 being substantially the same as the inside diameter of the neck 11. The neck 19 is of such a length that when the container 17 is positioned within the tube 10, the top of the neck 19 is substantially flush with the top of the neck 11 of the tube 10.

The bottom of the tube 17 is sealed by a strip 22. A metal band 23a encircles the neck 11 of the tube 10 below the lip 12.

A nipple 23 is screw-threaded around the bottom portion thereof, as shown at 24, and is adapted to fit the screw-threads 20 on the inside of the neck 19. The outside diameter of the bottom portion of the nipple 23 may be slightly larger than the inside diameter of the neck 19, so that the neck 19 will be forced against the neck 11 which will, in turn, be expanded tightly against the band 23a.

The upper portion 25 of the nipple 23 is of slightly greater diameter than the lower portion thereof, forming a flange 26, which bears against the top of the neck 19 when the nipple 23 is screwed into position in relation thereto which forms an air tight connection between the bottom portion of the nipple and the tube 17.

The nipple 23 is centrally apertured at 27. The upper portion of said nipple is screw-threaded and adapted to receive a cap 28 which has a conical shaped head 29 with a chamber 35 therein. The cap 28 has an orifice 30 at the apex of the conical surface of said cap. The cap 28 is adapted to be screwed tightly against the top of the neck 11 of the tube 10, which causes the bevelled portion 21 of the container 17 to be drawn tightly against the bevelled portion 13 of the tube 10, thereby holding the container 17 agaainst being moved inwardly or outwardly in relation to the tube 10.

The container tube 17 is held from turning within the casing tube 10 by means of the extensions 15 and 16 at the bottom of the tube 10 which, when fastened together, clamp against the strip 22 of the tube 17.

A ball 31, which serves as a marking ball, is positioned in the orifice 30 at the top of the cap 28. A pin 32 having a head 33 is acted upon by a spring 34, the spring acting to retain the ball in a seated position, the same being positioned between the head 33 and the top of the nipple 23. The pin 32 extends through the spring 34 and through the aperture 27 in the nipple 23.

When it is desired to use the marking implement of this invention, the container 17 is inserted into the tube 10 through the bottom thereof, the container being slided into the tube 10 a distance, so that the top of the neck 19 of the container tube 17 is flush with the top of the neck 11 of the tube 10. The nipple 23 is then screwed into the neck 19 until the flange 26 engages the top of said neck. The pin 32 and the spring 34 are then positioned on top of the nipple 23, the pin 32 extending downwardly into the aperture 27 and upwardly into the cap 28. The ball 31 is placed in the aperture 30 of the cap 28 and the cap is screwed onto the upper portion of the nipple 23 until the bottom of said cap tightly engages the top of the neck 11.

When it is desired to write with this implement, the tube 10 is compressed by the operator which, in turn, compresses the container 17, the pressure causing the viscous marking fluid to flow through the aperture 27 into the chamber 35. Pressure may then be released from the tube 10, which immediately returns to its predetermined shape, since the same is made of an elastic material. The container 17, however, retains its compressed condition within the tube 10, since the tube 17 is made of a non-elastic material. In this manner, no air can be drawn into the container 17 and the hardening of the marking material by air is prevented.

Sufficient air is admitted to the interior of the tube 10 through the air holes 18 to allow it to return to its normal condition.

The ball 31 is then pressed against the material to be marked by the writer, which depresses the ball against the tension of the spring 34, allowing the marking fluid to flow through the orifice 30.

When the fluid in the chamber 35 is consumed, the tube 10 is again compressed, which exerts pressure on the container 17, forcing more fluid through the aperture 27 into the chamber 35, the tube 10 returning to its pre-determined shape, but the container 17 staying in its compressed condition, no air being drawn into said container. This operation may be repeated until the entire contents of the container 17 are consumed.

When it is desired to remove the empty container 17 from the tube 10, the cap is unscrewed from the nipple 23 and the nipple 23 unscrewed from the neck 19 of the container 17, the extensions 15 and 16 are then pried apart and the empty container 17 withdrawn from the bottom of the tube 10, the tube 10 then being in condition to receive a filled container tube.

It is apparent that this specific embodiment shown and described has been given by way of illustration and not by way of limitation, and that the structure above described is subject to a wide variation and modification without departing from the scope or intent of the invention, all of which variations and modifications are to be included within the scope of the present invention.

What is claimed is:

1. A marking implement comprising a collapsible elastic tubular casing having a neck on one end thereof, the walls of said casing being of such a thickness as to normally retain the body in tubular shape, a tubular container of substantially non-elastic material constituting a container for a marking substance positioned within said casing, said container having a neck extending into the neck of said casing, a nipple received within the neck of said container and projecting outwardly of said container neck and the neck of said casing, a discharge member fitted upon the projecting portion of said nipple through which said marking substance is emitted, a combined marker and closure for the member movably mounted therein and retractable in writing position, means for yieldingly holding the marker and closure in a projected closed position, whereas upon the application of pressure to said casing the shape of both the casing and container therein is deformed causing said marking substance to be forcefully emitted from said container past the retracted marker when the implement is in writing position, said casing upon release of the pressure returning to its normal condition said container retaining its compressed condition.

2. A marking implement comprising a collapsible rubber tubular casing having an open end adapted to be closed, a neck on the opposite end of said casing, a tubular container for a marking substance of slightly less diameter than the inside diameter of said casing composed of a substantially non-elastic material and having a neck on one end thereof, said container being positioned within said casing through the open end thereof, the neck of said container extending into the neck of said casing, a nipple received within the neck of said container and projecting outwardly of said container neck and the neck of said casing, a discharge member fitted upon the projecting portion of said nipple through which said marking substance is emitted, a combined marker and closure for the member movably mounted therein and retractable in writing position, means for yieldingly holding the marker and closure in a projected closed position, whereas upon the application of pressure to said casing the shape of both the casing and container therein is deformed causing said marking substance to be forcefully emitted from said container past the retracted marker when the implement is in writing position, said casing upon release of the pressure returning to its normal condition said container retaining its compressed condition.

3. A marking implement comprising a collapsible rubber, tubular casing having air holes therein, the walls of the casing being of such a thickness as to normally retain the body in tubular shape, one end of the casing being opened and adapted to be sealed closed, a neck on the opposite end of said casing, a tubular container for a marking substance of slightly less diameter than the inside diameter of said casing composed of a substantially non-elastic material and having a neck on one end thereof said neck being of substantially the same diameter as the inside diameter of the neck of said casing, said container being positioned within said casing through the open end thereof, the neck of said container extending into the neck of said casing, a nipple received within the neck of said container and projecting outwardly of said container neck and the neck of said casing, a discharge member fitted upon the projecting portion of said nipple through which said marking substance is emitted, said member being adapted to engage the top of the neck of said casing, a combined marker and closure for the member movably mounted therein and retractable in writing position, means for yieldingly holding the marker and closure in a projected closed position, whereas upon the application of pressure to said casing the shape of both the casing and container therein is deformed causing said marking substance to be forcefully emitted from said container past the retracted marker when the implement is in writing position, said casing upon release of the pressure returning to its normal condition said container retaining its compressed condition.

4. A marking implement comprising a collapsible elastic, tubular casing having a neck on one end thereof, the walls of said casing being of such a thickness as to normally retain the body in tubular shape, a tubular container of substantially non-elastic material constituting a container for a marking substance positioned within said casing, said container having a neck extending into the neck of said casing, said neck being internally threaded the outside diameter thereof being of substantially the same diameter as the inside diameter of the neck of said casing, a threaded nipple received within the neck of said container and projecting outwardly of the necks of said casing and container, the outwardly projecting portion being of substantially the same diameter as the outside diameter of the neck of said container and a discharge cap internally threaded to engage the projecting portion of said nipple, the base of said cap bearing against the neck of the casing.

5. A marking implement comprising a collapsible rubber, tubular casing with air holes therein, the walls of the casing being of such a thickness as to normally retain the body in tubular shape, an open end on the casing with adjacent extensions thereon adapted to be fastened together and close said casing, a neck on the opposite end of said casing, a tubular container for a marking substance of slightly less diameter than the inside diameter of said casing composed of a substantially non-elastic material and having a neck on one end thereof said neck being internally threaded the outside diameter thereof being of substantially the same diameter as the inside diameter of the neck of said casing, said container being positioned within said casing through the open end thereof, the adjacent extensions on said open end when fastened together engaging the bottom of said container, the neck of said container extending into the neck of said casing, a threaded nipple received within the neck of said container and projecting outwardly of the necks of said casing and container the outwardly projecting portion being of substantially the same diameter as the outside diameter of the neck of said container and a discharge cap internally threaded to engage the projecting portion of said nipple, the base of said cap bearing against the neck of the casing.

FRED A. STURM.